April 20, 1965 G. SCHWESINGER 3,178,959
GEAR MECHANISM FOR SIMULATING PLANETARY MOTION IN A PROJECTION
PLANETARIUM, A SOLAR SYSTEM PROJECTOR, OR THE LIKE
Filed Feb. 25, 1963 4 Sheets-Sheet 1

INVENTOR:
Gerhard Schwesinger,
BY Singer, Stern + Carlburg,
ATTORNEYS.

| Planet | $\varepsilon$ | $\frac{e}{D}$ | $\frac{a}{D}$ | $\frac{A}{D}$ | $\frac{B_1}{D}$ | $\frac{B_2}{D}$ | $\alpha_1$ | $\alpha_2$ |
|---|---|---|---|---|---|---|---|---|
| Mercury | 0.2056 | 0.052095 | 1.00268 | 0.50134 | 0.49881 | 0.49852 | −28° | 20° |
| Mars | 0.0934 | 0.022399 | 1.00055 | 0.50027 | 0.49973 | 0.49972 | 22° | 18° |

INVENTOR:
Gerhard Schwesinger

BY Singer, Stern & Carlburg

ATTORNEYS.

3,178,959
GEAR MECHANISM FOR SIMULATING PLANETARY MOTION IN A PROJECTION PLANETARIUM, A SOLAR SYSTEM PROJECTOR, OR THE LIKE

Gerhard Schwesinger, Heidenheim (Brenz), Germany, assignor to Carl Zeiss-Stiftung, Wurttemberg, Germany, a corporation of Germany
Filed Feb. 25, 1963, Ser. No. 260,814
Claims priority, application Germany, Feb. 26, 1962,
Z 9,251
14 Claims. (Cl. 74—437)

The invention relates to a gear mechanism for use in simulating the motion of celestial bodies. This gear mechanism comprises substantially two gear wheels whose axes are arranged at a fixed distance away from each other and whose circumferences are in rolling engagement with one another.

The variable angular velocity of the elliptic orbit of a planet or a satellite follows the second one of Kepler's Laws. The angular velocity corresponding to this law has to be derived in a planetarium apparatus from the uniform angular velocity of the drive mechanism. The central body, that is the sun in the case of the motion of the planets, is positioned in the focal point of the orbital ellipse (first one of Kepler's Laws).

In the projection in a planetarium the orbital ellipses are represented preferably by figures which very closely resemble circles. The resulting error is the smallest when the central point of the approximately circular figure coincides with the central point of the ellipse and the radius of the approximately circular figure is made equal to the mean value of one half of the big and the small axis of the orbit. If the central point of the substitute circle coincides with the central point of the elliptical orbit and if a predetermined angular motion relative to the focal point of the ellipse is produced, then the correct angular velocity relative to the central point of the ellipse will be produced from the angular velocity relative to the focal point by means of an auxiliary gear mechanism.

It is an object of the invention to produce a simple gear mechanism for simulating the planetary motion in a substantially more precise manner than it is possible with known gear mechanisms.

The gear mechanism according to the invention consists of a pair of gear wheels which are non-circular with respect to their axes of rotation and which roll upon one another, whereby the gear wheels are arranged from each other in a fixed axial distance $a$ and are characterized in that the drive wheel performs a uniform rotation in the time period $t$ about an angle $\psi$, while the driven wheel performs during the same time period a rotation about an angle $\vartheta$. The rotative movement of the drive wheel (angle of rotation $\psi$) should satisfy exactly or at least in a good approximation the first equation of Kepler, while the rotative movement of the driven wheel (angle of rotation $\vartheta$) corresponds substantially to the angular motion of the planet relative to the center point of the orbital ellipse.

These and other objects and details of the invention will now be described with reference to the accompanying drawings, in which FIG. 1 illustrates diagrammatically the mathematical relations of the movement of the planets;

Figure 1:
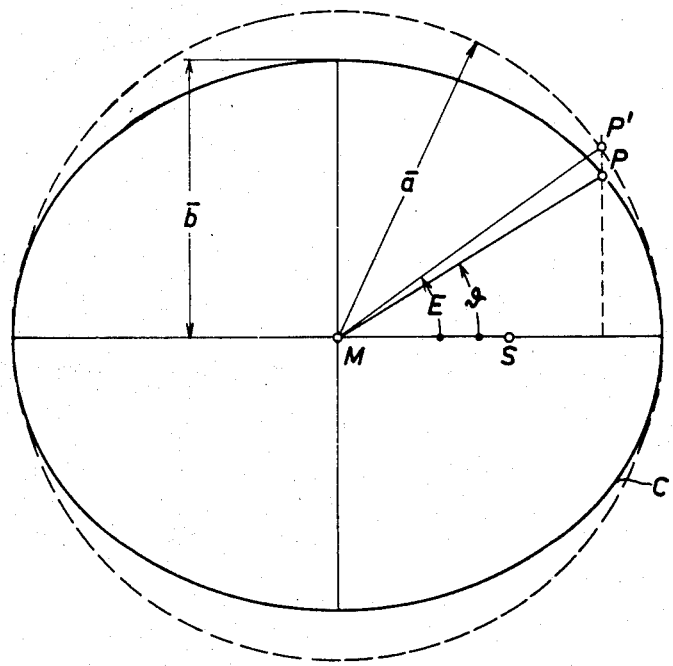
FIG. 1 illustrates the elliptical orbit C of a planet with the radii $\bar{a}$ and $\bar{b}$, the center point M and the focal point S where the sun is positioned. This ellipse C is enclosed by a dash line representing a circle having the radius $\bar{a}$.

The angle between the largest diameter of the ellipse and the instantaneous position P of the planet relative to the center point M of the ellipse is designated with $\vartheta$. The angle E defines the "eccentric anomaly" of the orbital ellipse C. The auxiliary point P′ located on the circle surrounding the ellipse C serves for a better understanding of the definition of the eccentric anomaly E of the ellipse C.

For the orbit of the planet apply the following equations:

$$\psi = E - \epsilon \sin E \text{ (Kepler's equation)} \quad (1)$$

$$tg\vartheta = \beta tgE \quad (2)$$

$$\beta = \sqrt{1 - \epsilon^2} \quad (3)$$

wherein the angle of rotation $\psi$ represents the mean angular motion, also known as mean anomaly of the planetary motion, $\epsilon$ is the numerical eccentricity of the orbital ellipse, and $\beta$ is a constant to be computed from the eccentricity of the orbital ellipse. The angle of rotation $\vartheta$ defines the angular motion of the planet relative to the center point of the orbital ellipse.

Accordingly to the invention the gear mechanism consists of two non-circular wheels the radii of which can be represented in polar coordinates as functions of the angles of rotation pertaining thereto:

$$r_1[\psi(E)] \quad (4)$$

$$r_2[\vartheta(E)] \quad (5)$$

wherein the radius of the drive wheel is designated with index 1, the radius of the driven wheel with index 2 and the angles of rotation $\psi$ and $\vartheta$ satisfy the Equations 1 and 2, respectively.

With $a$ as a fixed wheel base then:

$$r_1 = \frac{\beta \cdot a}{\beta + (1 - \epsilon \cos E)(1 - \epsilon^2 \sin^2 E)} \quad (6)$$

A kinematic condition is further:

$$r_2 = a - r_1 \quad (7)$$

According to the Equations 6 and 7

$E = 0$ is also $\vartheta = 0$ and $\psi = 0$, and
$E = \pi$ is also $\vartheta = \pi$ and $\psi = \pi$ (see FIG. 1)

It follows that $$r_1(0) = r_2(\pi) \text{ resp. } r_2(0) = r_1(\pi)$$

This means that the wheels in the direction of the radii 0 and $\pi$ have like diameters:

$$2A = r_1(0) + r_1(\pi) = r_2(0) + r_2(\pi) = a \quad (8)$$

The eccentricity of the wheels relative to the axis of rotation is then also the same, namely:

$$\frac{|r_1(0) - r_1(\pi)|}{r_1(0) + r_1(\pi)} = \frac{|r_2(0) - r_2(\pi)|}{r_2(0) + r_2(\pi)} \quad (9)$$

In the direction perpendicular to the radius vector with the diameter 2A the two wheels do not have exactly the same dimension. The difference is very slight.

Figure 2:
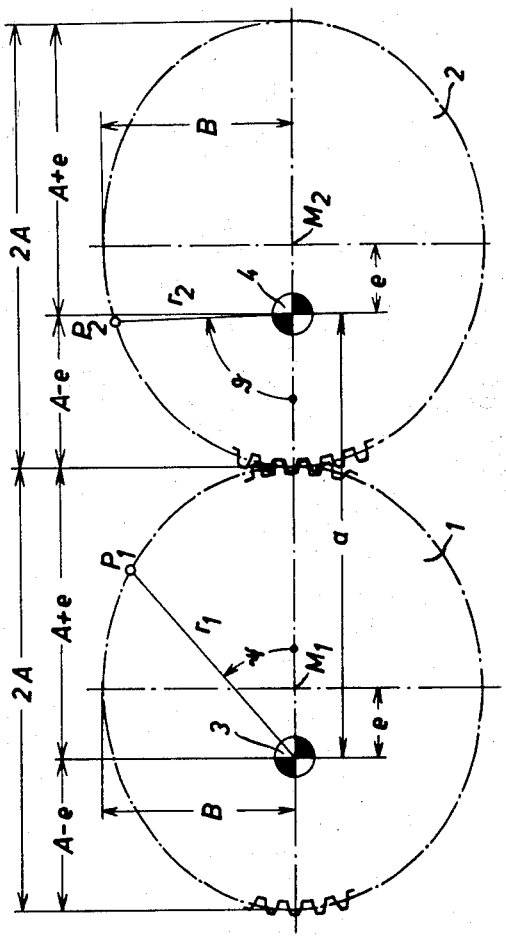
FIG. 2 illustrates diagrammatically and by way of examle one embodiment of a gear mechanism of the invention, and a table giving the gear wheel data for two planetary paths.

FIG. 2 illustrates two gear wheels 1 and 2 which are in rolling engagement with one another and have the same shape, and the diameter 2B in perpendicular direction to the diameter 2A is equal to the mean value of the two calculated exact diameter values. The wheels 1 and 2 roll upon each other and rotate about axes 3 and 4, respectively, which are arranged on the large diameter 2A eccentrically from the wheel centers $M_1$ and $M_2$ by the amount of $$e = (\tfrac{1}{2}\epsilon + \tfrac{1}{16}\epsilon^3)A \qquad (10)$$

The difference in the angle of rotation $\vartheta - \psi$ between the driven wheel 2 and the driving wheel 1 for such a gear is, when limiting the terms to the third power of $\epsilon$:

$$\vartheta - \psi = (\epsilon + \tfrac{1}{8}\epsilon^3)\sin\psi + \tfrac{1}{4}\epsilon^2 \sin 2\psi + \tfrac{1}{12}\epsilon^3 \sin 3\psi + \ldots \qquad (11)$$

The corresponding Fourier's series for the exact value of the difference $\vartheta - \psi$ differs from the Equation 11 only in the third term which is $+\tfrac{1}{8}\epsilon^3 \sin 3\psi$. Therefore, the error in the angle of rotation difference in the gear mechanism illustrated in FIG. 2 is only a fraction of $\epsilon^3$.

In the table forming the lower portion of FIG. 2 are given the principal dimensions of the illustrated gear drive for two highly eccentric planets, namely Mercury and Mars, whereby the wheels are produced by distorting a gear wheel rim from the partial diameter D (D=modulus×registered number) along axes which are perpendicular to each other.

Figure 3:
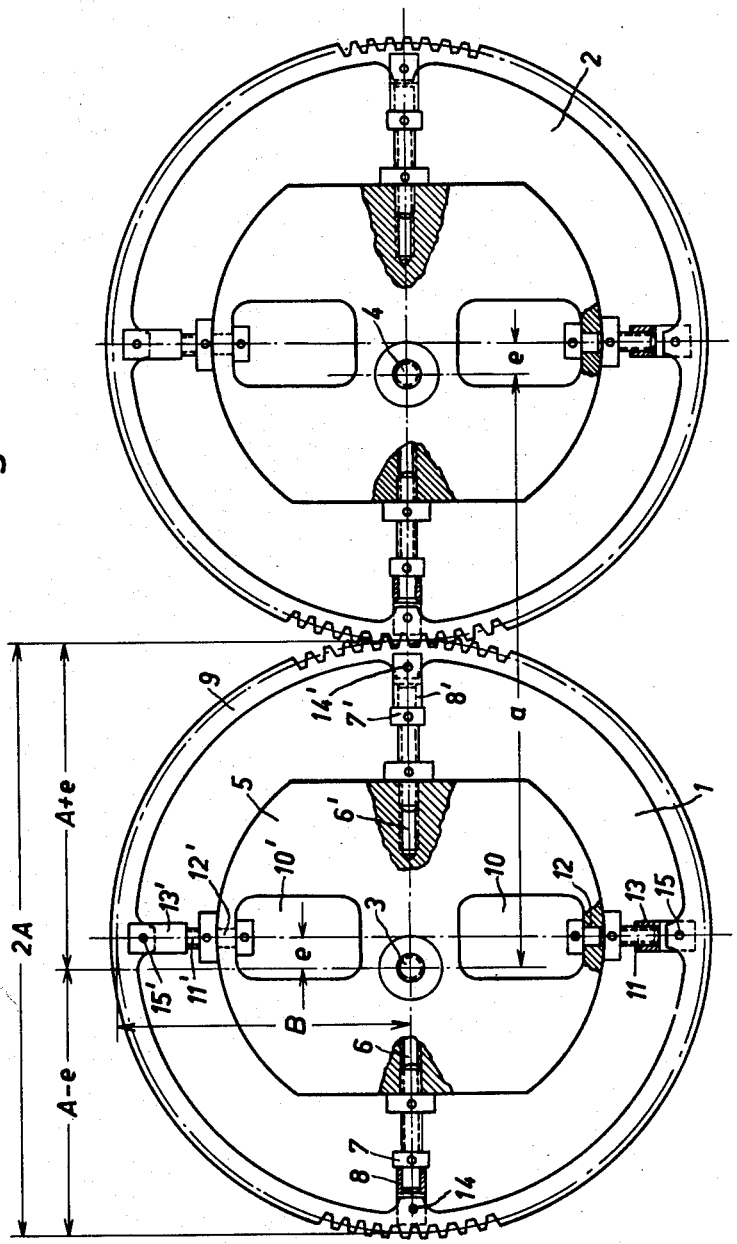
FIG. 3 illustrates one embodiment of a construction of the gear mechanism of the invention.

FIG. 3 illustrates in a top view an embodiment of the invention shown in FIG. 2. The driving wheel 1 is mounted on a drive shaft 3 which rotates uniformly with the angular velocity of $d\psi/dt$ and has eccentrically mounted thereon a plate 5 provided in one of the symmetry axes with threaded holes 6, 6' which are engaged by two adjusting screws 7, 7'. These two screws 7, 7' engage with one of their ends the brackets 8, 8' which are connected to the rim 9 of the gear wheel 1 by pins 14, 14'. By an adjustment of the screws 7, 7' the gear wheel rim 9 can be horizontally expanded. In the other symmetry axis of the plate 5 are arranged in rectangular openings 10, 10' the heads of two adjusting screws 11, 11'. The screws 11, 11' extend outwardly through holes 12, 12' provided in the outer portion of the plate 5 and are screwed into brackets 13, 13' which are fastened by pins 15, 15' to the gear wheel rim 9. The four bracket securing pins 14, 15, 14' and 15' are arranged one from the other at an angular distance of 90°. By turning the adjusting screws 11, 11' an inwardly directed pull may be exerted on the gear wheel rim 9 perpendicular to the direction of the aforementioned expanding force. Thus, the four adjusting screws 7, 7' and 11, 11' permit an exact adjustment of the diameters 2A and 2B to the values arrived at in the description of FIG. 2. Since the required distortions of the rim 9 are relatively small and assuming the thickness of the rim is sufficiently small, the elastic limit of the material from which the rim 9 is made will not be exceeded during these adjustments.

The driving wheel 1 is in engagement with a congruent non-circular gear wheel 2 which is mounted on a shaft 4 which is likewise arranged eccentrically by the amount $e$ as required by the Equation 10, and this wheel rotates in a direction opposite to the wheel 1 with an angular velocity of $d\vartheta/dt$. All individual parts of the wheel 2 are identical with those of the wheel 1 and are therefore not separately designated.

The construction of the gear mechanism illustrated in FIG. 3 has the advantage that the required dimensions of the wheels can be adjusted continuously. If in addition thereto also the eccentricity $e$ of the axes of rotation 3 and 4 can continuously be adjusted and arrested, such a gear mechanism can be used for the representation of several planetary orbits.

Obviously, the wheels may also be constructed rigid and are then suitable only for the representation of one specific orbit. In such a case the rims of the gear wheels 1 and 2 are permanently distorted by the required amounts in such a manner, for instance, that they are drawn upon carrier wheels whose rigid perimeters are so shaped that the rims will be distorted the required amounts in both directions. This modification of the invention requires, however, individually shaped wheels for each planet.

In order to keep the partial curve of the gear teeth as free from errors as possible, the rims of the wheels 1 and 2 may be given such a sectional shape that the neutral zone of the deformed section comes to lie halfways up the tooth.

Figure 4:
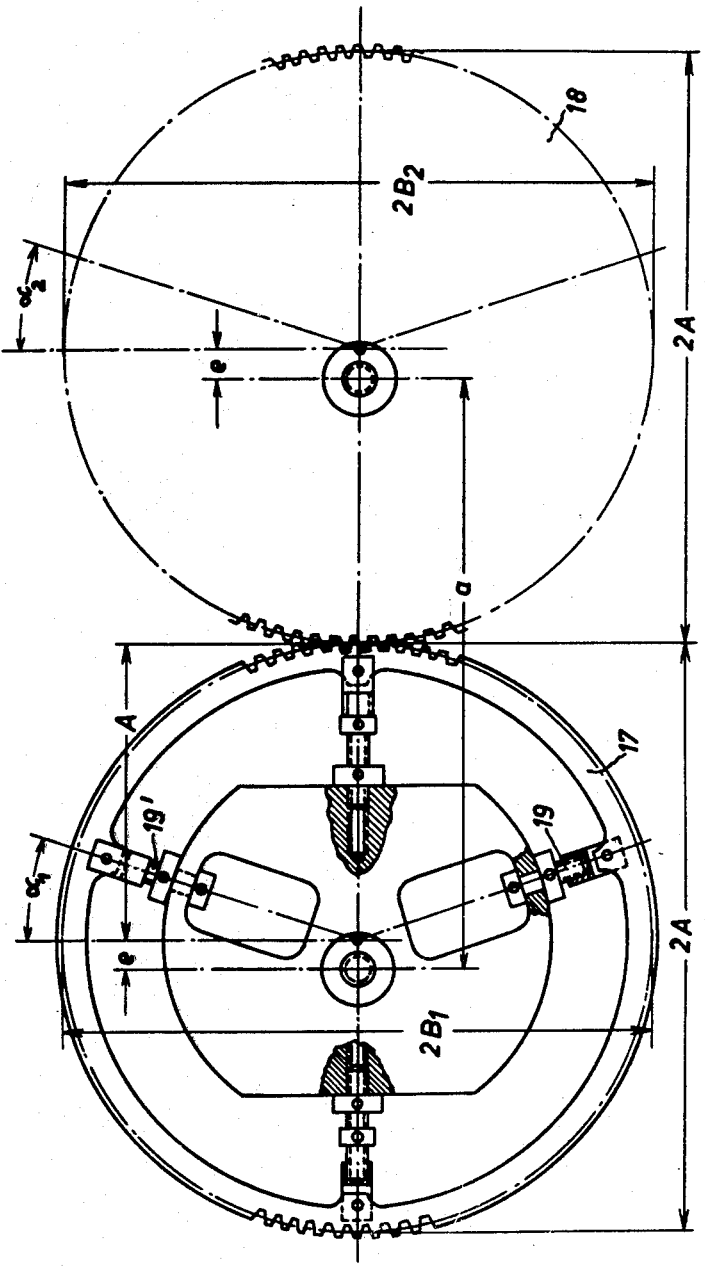
FIG. 4 illustrates another embodiment of the gear mechanism of the invention.

FIG. 4 is a top view of another embodiment of the gear mechanism according to the invention in which a further improvement is obtained. In this embodiment the gear wheels are not symmetrically distorted in both directions as in the embodiment illustrated in FIG. 3, but are only symmetrically distorted along the large diameters 2A.

With respect to the small diameters $2B_1$ and $2B_2$ of the driving wheel 17 and the driven wheel 18 there is no longer symmetry. This is obtained in the embodiment according to FIG. 4 in that the screws 19, 19' which adjust the small diameter $2B_1$ or $2B_2$ respectively, no longer act upon this diameter but are angularly displaced to both sides thereof by an angle $\alpha_1$ and $\alpha_2$, respectively. Furthermore, the small diameters $2B_1$ and $2B_2$ are adjusted to somewhat different values. The large diameter 2A according to the Equation 8 remains the same for both wheels, and the fixed wheel base $a$ also remains the same. The details of FIG. 4 correspond to those of FIG. 3 and therefore are likewise not separately designated.

The upper portion of FIG. 4 shows a table containing the principal dimensions of the gear mechanism according to FIG. 4 for the representation of the orbits of the planets Mercury and Mars, respectively. The gear mechanism illustrated in FIG. 4 represents practically exact the angular motions of the planets which means that the residual errors are smaller than the inevitable gearing inaccuracies.

Another possibility to produce the desired nonsymmetry consists in arranging the adjusting screws on orthogonal axes and machining the gear wheels slightly eccentrically.

A comparison of the tables shown in FIG. 2 and in FIG. 4 reveals that these refinements, namely the nonsymmetry of the gear mechanism according to the invention, produce a noticeable effect only with large eccentricities as they occur, for instance, in the orbit of the planet Mercury. In addition thereto, however, the improved form of the gear mechanism according to the invention is also capable of representing with great accuracy the movement conditions prevailing with considerably larger eccentricities, as for instance in certain elliptic satellite orbits.

What I claim is:

1. A gear mechanism for simulating the planetary motion in a projection planetarium comprising two gear wheels in rolling engagement with each other and rotating about axes arranged at a fixed distance from each other, said gear wheels having non-circular gear rims and the radii $r_1$ and $r_2$ of the driving gear wheel and the driven gear wheel being determined by the equations:

$$r_1 = \frac{\beta a}{\beta + (1 - \epsilon \cos E)(1 - \epsilon^2 \sin^2 E)}$$

and $$r_2 = a - r_1$$

in which $\epsilon$ is the numeral eccentricity, $$\beta = \sqrt{1 - \epsilon^2}$$

$\epsilon$ is the eccentric anomaly of the planetary orbit, and $a$ is the fixed distance between the axes of rotation of said two gear wheels.

2. A gear mechanism for simulating the planetary motion in a projection planetarium comprising two gear wheels in rolling engagement with each other and rotating about axes arranged at a fixed distance from each other, said gear wheels having non-circular gear rims and the radii $r_1$ and $r_2$ of the driving gear wheel and the driven gear wheel being determined by the equations:

$$r_1 = \frac{\beta a}{\beta + (1 - \epsilon \cos E)(1 - \epsilon^2 \sin^2 E)}$$

and $$r_2 = a - r_1$$

in which $\epsilon$ is the numeral eccentricity, $$\beta = \sqrt{1 - \epsilon^2}$$

$\epsilon$ is the eccentric anomaly of the planetary orbit, and $a$ is the fixed distance between the axes of rotation of said two gear wheels, and that the diameters which pass through the center point of said wheels and which are perpendicular to the largest diameters of said wheels are of the same length and are equal to the median value calculated for $r_1$ and $r_2$ from said equations, whereby the axes of rotation of said wheels pass each through a point which is positioned on said largest diameters (2A) and are spaced from the respective center point of the wheel a distance $e = A \cdot (\frac{1}{2}\epsilon + \frac{1}{16}\epsilon^3)$.

3. A gear mechanism according to claim 1, in which each of said gear wheels is provided with a gear rim which is distorted from a circular shape in at least two directions about said predetermined values into a non-circular shape.

4. A gear mechanism according to claim 1, in which each of said gear wheels is provided with a gear rim which is symmetrically distorted from a circular shape relative to the largest diameter (2A) of the same.

5. A gear mechanism according to claim 1, in which each of said gear wheels is provided with a gear rim which is distorted from a circular shape in the directions of two diameters which are positioned perpendicularly to one another.

6. A gear mechanism according to claim 1, in which the gear rims of said gear wheels are being formed into said calculated shape from an original circular shape.

7. A gear mechanism according to claim 1, in which the gear rims of said gear wheels are being formed into said calculated shape from an originally somewhat eccentric shape.

8. A gear mechanism according to claim 1, in which both said gear wheels are exactly alike and have the same non-circular gear rims.

9. A gear mechanism according to claim 1, in which both said gear wheels are provided with gear rims which are distorted along the great axes (2A) the same amount, while other distortions along the general direction of the short axes are provided on both gear rims along radial directions which are displaced from the short axes about angles ($\alpha_1$, $\alpha_2$, FIG. 4).

10. A gear mechanism according to claim 1, in which the gear rims of said gear wheels are distorted non-uniformly at different places of their circumferences.

11. A gear mechanism according to claim 1, in which each gear wheel comprises a gear rim, an eccentrically rotatably mounted plate within said gear rim, and means including two pairs of substantially radially positioned adjusting screws connecting said gear rim with said plate.

12. A gear mechanism according to claim 1, in which each gear wheel comprises a gear rim, an eccentrically rotatably mounted plate within said gear rim, and means including two pairs of substantially radially positioned adjusting screws connecting said gear rim with said plate, one pair of said adjusting screws being arranged in axial alignment and along an axis passing through the axis of rotation of said plate and being adapted to expand said gear rim at an oppositely positioned portion thereof.

13. A gear mechanism according to claim 1, in which each gear wheel comprises a gear rim, an eccentrically rotatably mounted plate within said gear rim, and means including two pairs of substantially radially positioned adjusting screws connecting said gear rim with said plate, one pair of said adjusting screws being arranged in axial alignment and along an axis passing through the axis of rotation of said plate and being adapted to expand said gear rim at oppositely positioned portion thereof, said other pairs of adjusting screws extending along axes which pass through said axis of rotation but extend (at an angle with respect) to the axis of said axially aligned adjusting screws, said other pair of adjusting screws being adapted to contract the portions of the gear rims to which they are attached.

14. A gear mechanism according to claim 1, in which each gear wheel comprises a gear rim, an eccentrically rotatably mounted plate within said gear rim, and means including two pairs of substantially radially positioned adjusting screws connecting said gear rim with said plate, one pair of said adjusting screws being arranged in axial alignment and along an axis passing through the axis of rotation of said plate and being adapted to expand said gear rim at an oppositely positioned portion thereof, said other pair of adjusting screws extending along axes which pass through said axis of rotation but extend perpendicular to the axis of said axially aligned adjusting screws, said other pair of adjusting screws being adapted to contract the portions of the gear rims to which they are attached.

References Cited by the Examiner

UNITED STATES PATENTS

| 1,507,908 | 9/24 | Crawford | 74—393 |
| 2,957,363 | 10/60 | Ingham et al. | 74—437 |

DON A. WAITE, *Primary Examiner.*